(12) United States Patent
Kimball et al.

(10) Patent No.: US 9,375,725 B2
(45) Date of Patent: Jun. 28, 2016

(54) SYSTEM AND METHOD FOR THE TREATMENT OF OIL SANDS

(75) Inventors: Gregory J. Kimball, Blaine, MN (US); Joseph Merwyn Bonem, New Braunfels, TX (US); David Lonnie Phillips, Shoreview, MN (US)

(73) Assignee: BEPEX INTERNATIONAL, LLC, Minneapolis, MN (US)

( * ) Notice: Subject to any disclaimer, the term of this patent is extended or adjusted under 35 U.S.C. 154(b) by 613 days.

(21) Appl. No.: 13/310,226

(22) Filed: Dec. 2, 2011

(65) Prior Publication Data
US 2012/0138511 A1    Jun. 7, 2012

Related U.S. Application Data

(60) Provisional application No. 61/419,578, filed on Dec. 3, 2010.

(51) Int. Cl.
| | | |
|---|---|---|
| C10G 1/04 | (2006.01) | |
| B03B 9/02 | (2006.01) | |
| B01D 21/26 | (2006.01) | |

(52) U.S. Cl.
CPC . *B03B 9/02* (2013.01); *C10G 1/045* (2013.01); *B01D 21/262* (2013.01); *B01D 21/267* (2013.01); *C10G 2300/4081* (2013.01); *C10G 2300/44* (2013.01); *C10G 2300/805* (2013.01)

(58) Field of Classification Search
CPC .......... C10G 1/04; C10G 1/045; C10G 1/047; C10G 1/00; C10G 2300/805; C10G 2300/4081; C10G 2300/44; F26B 1/00; F26B 3/00; F26B 3/02; F26B 23/002; F26B 2200/14; B03B 9/02; B01D 21/262; B01D 21/267
USPC .......................... 208/391, 390, 424, 425, 428
See application file for complete search history.

(56) References Cited

U.S. PATENT DOCUMENTS

| | | | |
|---|---|---|---|
| 3,161,581 A | 12/1964 | Tiedje | |
| 3,808,120 A | 4/1974 | Smith | |
| (Continued) | | | |

FOREIGN PATENT DOCUMENTS

| | | |
|---|---|---|
| CA | 2665747 | 11/2009 |
| CA | 2665751 | 11/2009 |
| (Continued) | | |

OTHER PUBLICATIONS

Perry's Chemical Engineers' Handbook (7th ed. 1997), pp. 12-76 to 12-90.*

(Continued)

*Primary Examiner* — Prem C Singh
*Assistant Examiner* — Brandi M Doyle
(74) *Attorney, Agent, or Firm* — Fredrikson & Byron, P.A.

(57) ABSTRACT

Extraction of bitumen from oil sands may generate oil sands tailings mixed with a liquid. Systems may be used to separate the liquid from the tailings so the tailings can be disposed or otherwise reclaimed. In some examples, a system includes a primary separation vessel configured to receive oil sands tailings mixed with water and to separate the oil sands tailings into a plurality of layers, where at least one of the plurality of layers includes a mature fines tailing material. The system may include an apparatus configured to receive the mature fines tailing material from the primary separation vessel and to mechanically separate a portion of the water in the mature fine tailings material. The system may also include an apparatus configured to receive a concentrated oil sands tailings material and to thermally evaporate water from the concentrated oil sands tailings materials, thereby producing trafficable dried oil sands tailings.

16 Claims, 7 Drawing Sheets

(56) References Cited

U.S. PATENT DOCUMENTS

| | | | |
|---|---|---|---|
| 3,811,614 | A | 5/1974 | Curtin |
| 3,900,389 | A | 8/1975 | Baillie |
| 3,901,791 | A | 8/1975 | Baillie |
| 4,035,282 | A | 7/1977 | Stuchberry |
| 4,116,809 | A | 9/1978 | Kizior |
| 4,139,450 | A | 2/1979 | Hanson |
| 4,460,452 | A | 7/1984 | Johnson |
| 4,473,461 | A | 9/1984 | Thacker |
| 4,812,225 | A | 3/1989 | Corti |
| 5,146,857 | A * | 9/1992 | Spliethoff ............... F01K 17/06 110/224 |
| 5,762,780 | A | 6/1998 | Rendall |
| 6,019,888 | A | 2/2000 | Mishra |
| 7,691,259 | B2 | 4/2010 | Freeman |
| 7,695,612 | B2 | 4/2010 | Erasmus |
| 7,814,867 | B2 | 10/2010 | Tsilevitch |
| 2007/0272596 | A1* | 11/2007 | Erasmus et al. ............. 208/400 |
| 2008/0099380 | A1* | 5/2008 | Lahaie et al. ............. 208/424 |
| 2009/0020458 | A1* | 1/2009 | Bozak et al. ............. 208/390 |
| 2010/0133149 | A1 | 6/2010 | O'Connor |
| 2010/0147516 | A1 | 6/2010 | Betzer-Zilevitch |
| 2011/0061610 | A1* | 3/2011 | Speirs et al. ............. 122/32 |

FOREIGN PATENT DOCUMENTS

| | | |
|---|---|---|
| CA | 2677479 | 1/2010 |
| CA | 2694847 | 8/2010 |

OTHER PUBLICATIONS

Mikula, RJ et al., "Centrifugation Options for Production of Dry Stackable Tailings in Surface-Mined Oil Sands Tailings Management", Journal Canadian Petroleum Technology, 48 (9): Sep. 19-23, 2009, Abstract.

Adeyinka, OB, et al., "Effect of Particle Size on the Rheology of a Athabasca Clay Suspensions" Canadian Journal of Chemical Engineering, 87 (3): 422-434 Jun. 2009, Abstract.

Eckert, WF, et al., "Prediction of sedimentation and consolidation of fine tails", Aiche Journal, 42 (4): 960-972 Apr. 1996, Abstract.

Theriault, Y, et al., "The Effect of Chemical, Physical and Enzymatic Treatments on the Dewatering of Tar Sands Tailings", Fuel, 74 (9): 1404-1412 Sep. 1995, Abstract.

Mikhail, SA et al., "Application of thermal techniques in the recovery of heavy minerals from oil sand tailings", Thermochimica Acta, 273: 103-111 Feb. 1, 1996, Abstract.

"Tailings Performance Criteria and Requirements for Oil Sands Mining Schemes", ERCB Directive 074, Feb. 3, 2009, http://www.ercb.ca/regulations-and-directives/directives/directive074, accessed from web on Aug. 7, 2012.

Simieritsch et al., "Tailings Plan Review", Pembina Foundation and Water Matters, 2009, www.pembina.org, 36 pages.

Betzer-Zilevitch, "Intensive Heat Method for Using Non-Segregate Fine Tailings for Generating Hot Process Water and Stable Solids that Can Support Traffic", Ex-Tar Technologies Inc., www.ex-tar.com, date unknown, 21 pages.

Graham et al., "A Solvent Extraction Process for Tar Sand", 1987 Eastern Oil Shale Symposium, Nov. 18-20, 1987, 9 pages.

BGC Engineering Inc., Oil Sands Tailings Technology Review, Oil Sands Research and Information Network, University of Alberta, School of Energy and the Environment, Edmonton, Alberta, OSRIN Report No. TR-01, 2010, 144 pages.

International Search Report and Written Opinion, dated Jun. 6, 2012 for PCT/US2011/063078, 14 pages.

* cited by examiner

SYSTEM AND METHOD FOR THE TREATMENT OF OIL SANDS

This application claims the benefit of U.S. Provisional Patent Application No. 61/419,578, filed Dec. 3, 2010, the entire contents of which are incorporated herein by reference.

TECHNICAL FIELD

This disclosure relates to material processing and, more particularly, to the processing of oil sands and oil sand tailings.

BACKGROUND OF THE DISCLOSURE

Mineable oil sands, also known as tar sands, typically contain mixtures of oil, sand, clay, and water. These sands can be mined, and the oil (which may also be referred to as bitumen) component removed for further processing or use. The composition of oil sands can vary considerably from location to location, hence, the preferred method used to remove the bitumen from the sand and clay can tend to change considerably as well between different locations. In many instances, bitumen is separated from the mined sand and clay by mixing the components with a liquid, such as water or an organic liquid.

A typical organic liquid solvent extraction process is described, for instance, in "A Solvent Extraction Process for Oil sand", R. J. Graham, et al. This reference describes the manner in which ore from an open pit mine is initially crushed in mills. To achieve extraction, bitumen is dissolved in heptane solvent, and the coarse sand is separated from the solvent/bitumen. The fine mineral is removed by pentane deasphaltening in the course of fines removal, and solvent is recovered from the coarse tailings by steam stripping. After the solvent has been recovered from the bitumen, the bitumen may be topped in a crude unit. The process can produce both coarse filings, which are disposed of, and fine tailings, which are ultimately recovered and conveyed to a circulating fluid bed combustor.

By comparison, in a conventional water based process, the bitumen is first, and largely, removed in the form of a bitumen "froth" by mixing the extracted oil sands with hot water. The bitumen can gravity separate from the clay and sand, resulting in a bitumen-rich phase, a solid phase, and an intermediate phase of clay and/or sand suspended in water. The solids phase and the intermediate suspension can, alone or in combination, be referred to as oil sand tailings or, at times, effluent. Further separation of the water from the clay and/or sand in the intermediate suspension can be difficult because the suspension may include extremely fine particles of clay that form a stable suspension. Currently, suspensions of this type are being accumulated with no immediate disposition.

Increased attention is being paid to oil sands, including for instance, a directive issued by the Energy Resources Conservation Board (ERCB) of Alberta, Canada, which will be applied to the reclamation practices at all mineable oil sands operations within their jurisdiction, and which will require the reduction of fluid tailings and their conversion into trafficable deposits. See "Tailings Performance Criteria and Requirements for Oil Sands Mining Schemes" directive issued by The Energy Resources Conservation Board of Alberta (ERCB/Board) on Feb. 3, 2009 ("Directive 74"). This directive sets out new requirements for the regulation of tailings operations associated with mineable oil sands, and is particularly concerned with the conversion of fine tailings extracted from oil sands into trafficable deposits (i.e., deposits that can support traffic).

SUMMARY

In general, this disclosure is directed to techniques for processing oil sands and oil sands tailings. Extraction of bitumen from oil sands may generate oil sands tailings mixed with a liquid. The liquid may include water or may be a non-aqueous solvent, such as heptane. In some examples, systems are described that can be used to separate the liquid from the tailings so the tailings can be disposed or otherwise reclaimed.

In one example, a process is described that includes delivering oil sands tailings mixed with water to a primary separation vessel so as to separate the oil sands tailings into a plurality of layers, where at least one of the plurality of layers comprises a mature fines tailing material that includes oil sands tailings suspended in water. The example process also includes extracting the mature fines tailing material from the primary separation vessel and delivering the mature fines tailing material to an apparatus configured to mechanically separate a portion of the water in the mature fine tailings material from a portion of the oil sands tailings suspended in the water so as to generate a concentrated oil sands tailings material. In addition, the example process includes delivering the concentrated oil sands tailings material to an apparatus configured to thermally evaporate water from the concentrated oil sands tailings materials so as to produce a trafficable dried oil sands tailings material.

In another example, a system is described that includes a primary separation vessel configured to receive oil sands tailings mixed with water and to separate the oil sands tailings into a plurality of layers, where at least one of the plurality of layers comprises a mature fines tailing material that includes oil sands tailings suspended in water. According to the example, the system also includes an apparatus configured to receive the mature fines tailing material from the primary separation vessel and to mechanically separate a portion of the water in the mature fine tailings material from a portion of the oil sands tailings suspended in the water so as to generate a concentrated oil sands tailings material. The example system further includes an apparatus configured to receive the concentrated oil sands tailings material and to thermally evaporate water from the concentrated oil sands tailings materials so as to produce a trafficable dried oil sands tailings material.

In another example, a process is described that includes separating oil sand mixed with a solvent into a stream that includes bitumen dissolved in the solvent and a stream that includes oil sands tailings mixed with the solvent. The example process also includes delivering the stream that includes oil sands tailings mixed with the solvent to a pressure vessel operating under a vacuum pressure so as to vaporize at least a portion of the solvent from the oil sands tailings.

The details of one or more examples are set forth in the accompanying drawings and the description below. Other features, objects, and advantages of will be apparent from the description and drawings, and from the claims.

DETAILED DESCRIPTION

Devices, systems and techniques are described for processing oil sands and oil sands tailings. Recovery of bitumen from mineable oil sands typically involves multiple processing steps in which oil sands are extracted from the ground and bitumen in the oil sands is separated from non-bitumen components (e.g., water, clay, sand, and the like). In some applications, either before or after being extracted from the ground, oil sands are mixed with a liquid to help separate the bitumen from non-bitumen components. The liquid may be or include water or a non-aqueous solvent such as, e.g., an organic solvent. Regardless of the type of liquid or the configuration of the particular bitumen extraction process, in some cases it may be desirable to recover the liquid used to separate the bitumen from non-bitumen components. The liquid can then be used, e.g., for further oil sands extraction and/or bitumen recovery operations, or disposed of.

In accordance with some examples described in this disclosure, a system for separating water from MFTs is described. The system may include a primary separation vessel configured to receive oil sands tailings mixed with water and to separate the oil sands tailings into a plurality of layers. The system may also include an apparatus configured to receive a mature fines tailing material from the primary separation vessel and to mechanically separate a portion of the water in the mature fine tailings material from a portion of the oil sands tailings suspended in the water. To further dry the mechanically separated material, the system may also include an apparatus configured to receive the mechanically separated material and to thermally evaporate water from the material so as to produce a dried oil sands tailings. In this manner, the system may produce dried oil sands tailing from MFTs.

In additional examples, a system for recovering an organic solvent from non-bitumen oil sand components is described. The system may include a separator to separate oil sand mixed with an organic solvent into a stream that includes bitumen dissolved in the organic solvent and a stream that includes oil sands tailings mixed with the organic solvent. The system may also include a pressure vessel configured to operate at a vacuum pressure. The stream that includes oil sands tailings mixed with the organic solvent can be continuously delivered to the pressure vessel at vacuum pressure so as to vaporize at least a portion of the organic solvent from the oil sands tailings, thereby drying the oil sands tailings.

Figure 1:
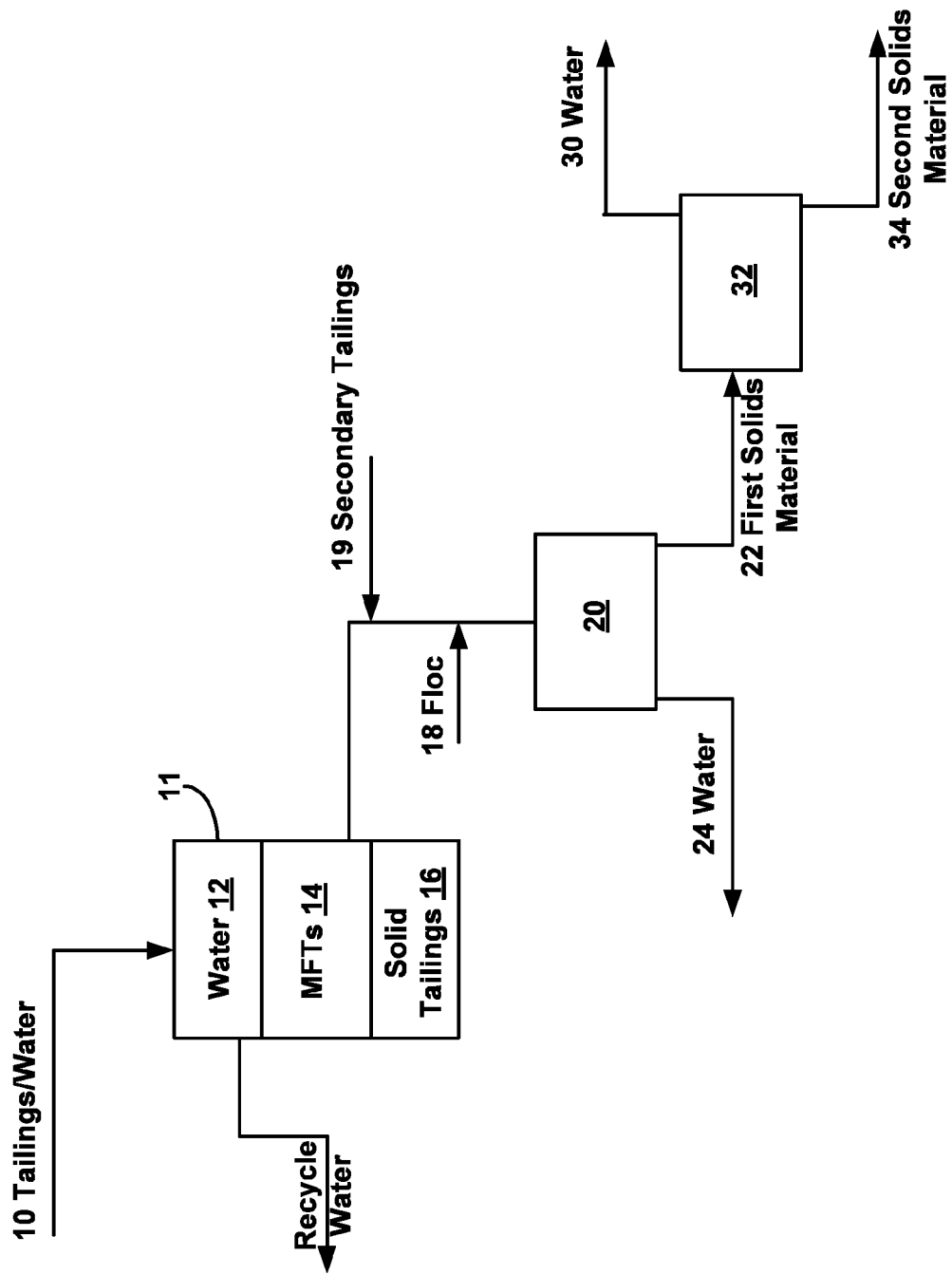
FIG. 1 is a flow diagram of an example process for recovering water from sand and/or MFTs.

FIG. 1 is a flow diagram of an example process that can be used to recover water from MFTs. As shown, oil (bitumen) is removed from oil sands in a prior system (10) (not shown) so as to generate a bitumen stream and a tailings stream. The tailing stream may include water and any components extracted (e.g., dissolved or washed) from the oil sands including, e.g., sand, clay, volatile organic compounds (VOCs), naphthenic acid, and the like. The tailing stream may also include some bitumen (residual bitumen) as the prior system may not perfectly separate the bitumen from the tailings.

In the process of FIG. 1, the tailing stream from the bitumen extraction system 10 is transferred to a primary separation vessel or pond 11, where the tailing stream separates into a water layer 12, a mature fine tailings (MFTs) layer 14, and a bottom layer of settled solids 16. Although the MFT layer 14 is itself suspended between the two layers, the MFT layer can be delivered to a first apparatus 20 (e.g., via a pump or other conveyance device) for mechanically separating water in MFT layer 14 from solid materials (e.g., sand, clay) suspended in the water. First apparatus 20 may be implemented as a centrifuge, a filter, or other mechanical separation device or combinations of devices. In different examples, first apparatus 20 may include (e.g., may be) one or more of the following:

1) a decanter centrifuge, such as the ALDEC G3 available from Alfa Laval. Such a centrifuge may provide an optimal combination of lower power consumption (which also greatly reduces $CO_2$ emissions), boost in processing capacity—or drier cake, reductions in life cycle costs, efficient bio-solids handling, and process monitoring and control.

2) a screen or solid bowl centrifuge. An example of such a centrifuge is the Bird Screen Bowl Centrifuge, available from Andritz, which is said to combine the clarifying benefits of a solid bowl centrifuge together with a final dewatering screen section to produce maximum dryness. Conventional Screen Bowl Centrifuges of this type are available with bowl diameters ranging in size from 18 inches to 54 inches (450 to 1,370 millimeters) with handling capacities from a hundred pounds (45 kilograms) per hour to well over 56 tons (50 metric tons) per hour of dry solids.

3) a rotary drum filter, including conventional types that are available from a variety of suppliers, 4) a filter press, e.g., chamber filter presses and membrane filter presses as are available from Andritz, 5) a plate and frame type filter press, as is available from Met-Chem, Inc., e.g., for use in dewatering industrial sludge or hazardous wastes, and reclaiming precious metals, 6) a belt type filter press, as is available from Komline-Sanderson in the form of a biosolids/sludge dewatering device that applies mechanical pressure to a chemically conditioned slurry, which is sandwiched between two tensioned belts, by passing those belts through a serpentine of decreasing diameter rolls. The machine can actually be divided into three zones: a gravity zone, where free draining water is drained by gravity through a porous belt; a wedge zone, where the solids are prepared for pressure application; and a pressure zone, where medium, then high pressure is applied to the conditioned solids, 7) a leaf filter, as is available from Mahle, and others, and 8) a hydrocyclone, which relies upon the centrifugal separation principle to remove or classify suspended solids in a slurry, and is available from a variety of sources, including Compatible Components Corporation.

As shown in FIG. 1, flocculent 18 can optionally be added to the tailings from the primary separation vessel or pond 11. Also, tailings 19 from other processing steps, such as tailings from other sources, may be combined with the tailings from the primary separation vessel or pond 11. Flocculants tend to be chemicals (e.g., inorganic or polymeric) that promote flocculation by causing suspended particles in liquids to aggregate, forming a floc. Suitable flocculants may provide an optimal combination of properties, including particle size and surface attraction.

To bring tailings to a state of preferred readiness for mechanical dewatering via first apparatus 20 (e.g., centrifugation), flocculant can be added to the MFTs, in order to promote flocculation, with the large-sized grains evidently serving as nuclei for the fine solid particles to attach to. At optimum flocculant levels the effectiveness of mechanical dewatering may be maximized, leading to one or more properties (e.g., dewatering time and/or effectiveness, cake moisture, and solids levels in the filtrate) that are improved as compared to a similar system without the use of flocculant. Too little or too much flocculant can prevent the filtration effectiveness being at the maximum. Further, too much flocculant is wasteful of chemicals, and given the large volumes of tailings involved in an extraction plant, this could represent serious economic cost.

Examples of suitable flocculants that are available commercially include lime (including limestone), alum, aluminum chlorohydrate, aluminum sulfate, calcium oxide, calcium hydroxide, iron(III), chloride iron(II), sulfate polyacrylamide, polyDADMAC, sodium aluminate, and sodium silicate. Other suitable flocculants are polymeric in nature.

Independent of whether flocculant 18 is used in the process of FIG. 1, first apparatus 20 may be configured to separate a portion of MFT layer 14 into a first solids material (e.g., water/clay mix) 22 and a supernatant 24. The supernatant 24 may be water substantially (e.g., entirely) free from solids (e.g., sand and/or clay). The supernatant 24 can be removed from first apparatus 20 and may be further used, recycled, or disposed. The first solids material 22 generated by first apparatus 20 may be solids originally suspended in MFT layer 14 (e.g., clay, sand). First solids 22 may include water, although the water will typically be lower in concentration than the concentration found in MFT layer 14 due to the dewatering action of first apparatus 20. For example, the portion of MFT layer 14 entering first apparatus 20 may exhibit between 60 wt % and 90 wt % water (e.g., between 65 wt % and 75 wt % water), while first solids 22 may exhibit less than 50 wt % water (e.g., between 35 wt % water and 47.5 wt % water, between 65 wt % solids and 45 wt % solids). In some examples, first solids 22 may be conveyed to one or more second apparatuses for further water removal. The one or more second apparatuses may provide a heater/dryer/condenser process where residual moisture in first solids 22 is vaporized to separate the water from the solid materials in the stream. In some specific examples, residual moisture in first solids 22 can be removed by applying heat to the stream.

The example process of FIG. 1 includes second apparatus 32, which may be used to reduce the moisture content of first solids 22 generated by first apparatus 20. Second apparatus 32 may be configured to remove water from first solids 22 so as to generate a water stream 30 and a second dried solids stream 34. Water stream 30 may include water substantially (e.g., entirely) free from solids (e.g., sand and/or clay). Second solids stream 34 may include solids originally suspended in MFT layer 14 (e.g., clay, sand). Seconds solids stream 34 may be entirely free of water or may include a lower concentration of water than exhibited by first solids 22 due to the dewatering action of second apparatus 32. For example, second solids stream 34 may exhibit less than 35 wt % water (e.g., less than 30 wt % water, between 20 wt % and 30 wt % water).

Second apparatus 32 can dry second solids stream 34 to any suitable moisture weight, preferably so that the solids meet whatever requirement are in place regarding their further use or handling. In some examples, second solids stream 34 is itself further processed, e.g., to recover rare inorganic compounds, and/or it can be returned to the mines or other pit and that land can then be reclaimed. Water stream 30 generated by application of heat via second apparatus 32 can be condensed and can itself be recycled. For example, water stream 30 can be conveyed through a heat exchanger to recover energy and/or mixed directly with oil sand in a froth process, allowing the energy of the water to be used to heat recycled water used for the bitumen froth process. As another example, water stream 30 may not be condensed in a heat exchanger but may instead be directly added (e.g., mixed) with recycle water from the primary separation vessel or pond 11, wet sand, or another stream to condense the water directly. Independent of the specific disposition of water stream 30, embodiments of the invention provide a MFT treatment process that eliminates the traditional MFT ponds and the years required to separate the clay from the water.

The system and process of the present invention can be adapted to achieve any desired purpose, including meeting the requirements of Canadian Directive 74. In general, Canadian Directive 74 specifies that MFTs must be dewatered to the point of being trafficable, or able to support traffic, before being permanently deposited on the ground or otherwise disposed. The Directive sets forth two parameters for determining if dewatered MFTs are trafficable within the meaning of the directive. First, the Directive specifies that dewatered MFTs should exhibit a shear stress of at least 5,000 Pascals one year after being deposited on the ground. Second, the Directive specifies that dewatered MFTs should exhibit a shear stress of at least 10,000 Pascals five years after of being deposited on the ground.

Though the Directive itself is toward the need for "trafficable" products, Applicant has attempted to correlate the term trafficable to parameters that are amenable to being measured or determined using conventional means. In particular, Applicant has correlated solids concentration with undrained shear strength. Without being bound by any particular value, Applicant estimates that producing a second solids material (e.g., second solids stream 34) containing greater than approximately 65 weight % solids (e.g., between approximately 67 wt % solids and 72 wt % solids, or greater than approximately 75 wt % solids), correlates with a shear stress of at least 10,000 Pascals. Producing a second solids material containing greater than approximately 65 wt % solids may therefore provide a solids material that immediately meets the five-year trafficability requirements of the Canadian Directive.

A process of this invention can be used to mechanically dewater MFT's from an original solids concentration (e.g., on the order of 30% solids, on a wet basis) to as low as necessary, e.g., to take the solids to at least about 40% or more solids content, and more preferably to about 50% or more solids content. Even more preferably, with or without the use of flocculant, the MFT's can be dewatered to on the order of about 55% or more solids, and even more preferably about 60% or more solids. Depending on the operator's desires, including economics, they may find it preferable to avoid the use of flocculant. Even though they will likely end up with a lower solids content (e.g., on the order of 50%), they may find it more cost effective to accomplish a further reduction in water content by other means.

Those skilled in the art will appreciate the manner in which various apparatuses can be used for the initial removal of bulk water from MFTs within the overall process of this invention.

For instance, a centrifuge suitable for use in the process and system of the present invention preferably provides an optimal combination of properties selected from the group consisting of centrate quality, energy consumption, and solids concentration.

Following the removal of bulk water from MFTs, the remaining clay/water mix (e.g., first solids 22) can be further dewatered using any appropriate means including, e.g., the application of heat, optionally in combination with vacuum. Suitable apparatuses for use in obtaining a second solids material include, for instance, dryers such as a direct dryer, flash dryer, and purge vessel. More specific examples of dryers that may be used include fluid bed dryers (e.g., Bepex), purge vessels (e.g., Bepex), flash dryers (e.g., Strong-Scott), dispersion dryers, ring dryers (e.g., GEA Barr-Rosin, Inc.), jet dryers (e.g., Crown Iron Works Co.), and rotary dryers.

Figure 2:
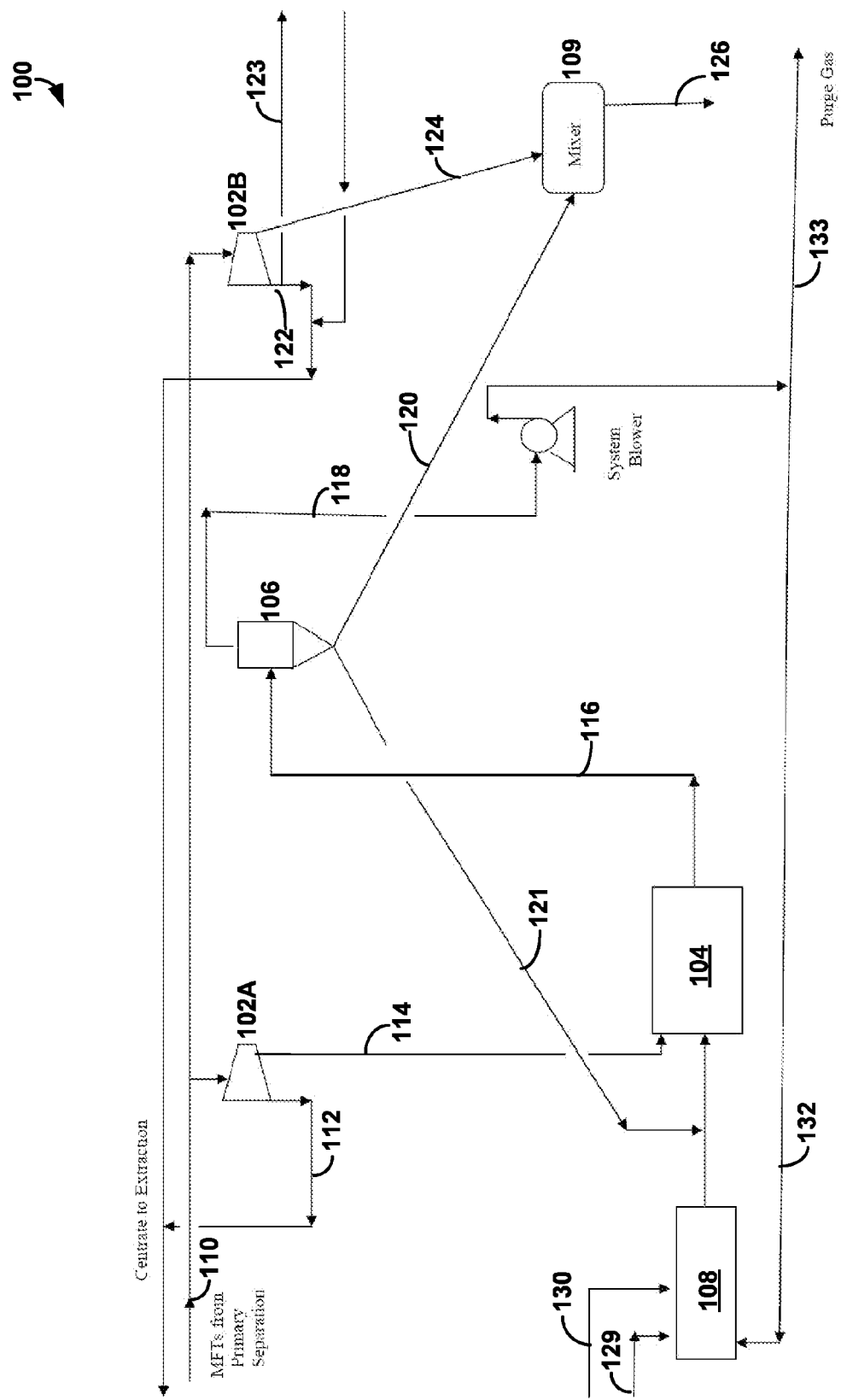
FIG. 2 is a flow chart illustrating an example system for treating tailings from oil sand that have undergone bitumen recovery by a water process.

Preferably, the method and corresponding system can include the use of a drying mechanism, e.g., a dryer. Options can include further conditioning the feed to the dryer by bringing the dryer product back to mix with the mechanical dewatering device product to improve dispersion of the feed into the air stream to improve drying performance. (See FIG. 2). This is shown in the example of FIG. 2 by mixing a portion of stream 121 with water/tailings mixture 114 to reduce the feed moisture to the drying system. It may also be best to introduce the feed directly into the fan that drives the dryer (e.g., when the dryer is a conventional dryer) to disperse the feed into the air stream. When the dryer is a dispersion dryer, it may be best to introduce the feed directly into the dispersion dryer to disperse the feed into the air stream rather than introducing the feed into an air stream that then enters the dispersion dryer.

Those skilled in the art will appreciate the manner in which existing devices and operating parameters can be used or customized for use in the process of the present invention. For instance, it may be desirable to maximize the dryer gas inlet temperature, e.g., up to 2000 F, in order to increase drying performance and moisture recovery. Similarly, it may be desirable to condense the gas/vapor exiting the dryer, in order to recover most of the water, particularly where water consumption is a major environmental concern. The condensed water may also be hot, as the gas/vapor mixture is very saturated, and most of the water can be recovered at near the boiling point of 212 F. Heat can also be recovered from the solids in a counter-flow cooling system.

Similarly, the hot water (or water vapor in other examples) can be recycled to the upstream separation system and/or it can be used for any suitable purpose, including for instance, it can be: a) recycled to the bitumen extraction that uses hot water, b) recycled to boiler feed water, c) recover the heat from the water by preheating the feed to the dryer, d) recover the heat from the water and then use for cooling tower makeup. All cooling towers have to have fresh water added since the process of cooling down the water for reuse involves vaporization of water in the cooling tower. Accordingly, use of recycled water may reduce fresh water requirements for a bitumen recovery process.

In a particularly preferred embodiment, the final solids product (e.g., second solids stream 34) is dried until the solids stream is trafficable. For example, the final solids product may exhibit a shear stress greater than 5,000 Pascals (e.g., greater than 10,000 Pascals) upon being discharged from second apparatus 32. Shear stress may be measured according to ASTM D4767-11. Depending, for example, on the composition of the final solids product, the solids product may be dried until the product has greater than approximately 65 wt % solids and less than approximately 35 wt % water (e.g., greater than approximately 75 wt % solids and less than approximately 25 wt % water). As discuss above, it is believed that a solids stream with less than approximately 35 wt % water (e.g., less than 25 wt % water in other examples), as may be produced via the process described with respect to FIG. 1, may immediately meet the Directive 074 requirements. That is, the solids stream may exhibit a shear stress greater than or equal to 10 KPa immediately after being discharged from second apparatus 32.

In some examples, second solids stream 34 may be over dried in second apparatus 32 (e.g., so the solids stream contains more than 80 wt %, more than 85 wt %, or even more than 90 wt % solids) rather than drying the stream to approximately 75 wt % solids (or other suitable weight percentage). The overdried solids stream can be combined with a portion of first solids 22, which may be mechanically dewatered via first apparatus 20 but not thermally dewatered via second apparatus 32. A final solids product meeting the requirements of Canadian Directive 074 may be produced more efficiently by combining an over-dried stream with an under-dried stream rather than drying the whole final solids stream to whatever requirements are needed. In some examples, a final solid material produced using the process of FIG. 1 (e.g., second solids stream 34) can be adapted to meet Directive 074 without further treatment and can immediately be utilized in a land reclaiming operation.

In a particularly preferred embodiment, a process and system of this invention can provide for the containment of various other components of oil sands, including in particular, the naphthenic acids and VOC (volatile organic compounds). As compared to conventional technologies, which tend to permit release of such materials to the atmosphere, in the process of the present invention, these materials can instead be recovered in the oil stream after being recovered in the recycled water, oxidized/destroyed in the drying process (e.g., in second apparatus 32), or flared.

FIG. 2 is a flow chart illustrating another example embodiment for the treatment of tailings from oil sands that have undergone bitumen recovery by a water process. Such tailings may be generated through a variety of different processes such as, e.g., the Clark hot water extraction process. In general, the Clark hot water extraction process generates tailings by mixing mined oil sands (which may include bitumen and tailings) with hot water and a basic component such as sodium hydroxide. In combination with frothing or other mechanical agitation, the bitumen may separate from the tailings to create a bitumen-rich phase and a water/tailings-rich phase. After separating the bitumen-rich phase from the water/tailings-rich phase, the water/tailings-rich phase may be sent to a settling pond to allow the tailings to gravity separate from the water.

In practice, extracted tailings do not fully gravity separate from commingled water within a commercially viable time span. Rather, as described above with respect to FIG. 1, such water/tailings mixtures typically separate into three general layers: an uppermost layer substantially free of tailings, a bottom layer of coarse/settled-out tailings, and a middle layer that comprises fine tailings suspended in water. The middle layer, which is sometimes referred to as a middling or mature fine tailings (MFTs) layer, typically includes from approximately 25 wt % to approximately 45 wt % solids and from approximately 75 wt % to approximately 55 wt % water, although other compositions may exist depending on the nature of the specific bitumen extraction process. Further, while the specific makeup of the tailing solids will vary, e.g., based on the geography of the location from which the solids were extracted, typical tailing solids include clay, silica, silt, or other similar components.

FIG. 2 is a flow chart illustrating an example system for treating tailings from oil sands that have undergone bitumen recovery by a water process. As shown, the example system 100 includes at least one centrifuge which is illustrated as two centrifuges 102A and 102B (collectively "centrifuge 102"), a thermal-mechanical dryer 104, a cyclone 106, and a furnace 108. In operation, a water/tailings mixture 110 is received by centrifuge 102 and is processed in the centrifuge to reduce the water content in the water/tailings mixture 110. The water/tailings mixture 110 may include water and tailings extracted (e.g., pumped, skimmed, etc.) from a MFT layer of a settling pond. In some examples, a flocculant or other settling agent is also included in the water/tailings mixture before processing in system 100. In either case, the centrifuge 102 may apply a centrifugal force to the water/tailing mixture 110 to produce an extracted water stream 112 and a water/tailings mixture 114 which exhibits reduced water content as compared to water/tailings mixture 110. Depending on the configuration of centrifuge 102, the centrifuge may receive the water/tailings mixture 110 that includes from approximately 10 wt % solids to approximately 40 wt % solids and from approximately 90 wt % to approximately 60 wt % water and generate water/tailings mixture 114 that includes from approximately 65 wt % solids to approximately 45 wt % solids (e.g., approximately 55 wt % solids) and from approximately 35 wt % water to approximately 55 wt % water (e.g., approximately 45 wt % water).

In addition, while system 100 is described as including centrifuges 102A and 102B, it should be appreciated that the disclosure is not limited to such an example mechanical dewatering device. Other devices that may be implemented in addition to or in lieu of a centrifuge include those devices described as being suitable for use as first apparatus 20 (FIG. 1).

In the example of FIG. 2, water/tailings mixture 114 from centrifuge 102 is transported to thermal-mechanical separator 104 to further reduce the water content in the water/tailings mixture. Thermal-mechanical separator 104 can be implemented as any piece of equipment or combinations of equipment that function to impart thermal and/or mechanical energy into water/tailings mixture 114 so as to separate a water component from the water/tailings mixture. Example implementations of thermal-mechanical separator 104 include a dryer, a flash drum, a dispersion dryer, a fluid bed dryer, a ring dryer, a spin flash dryer, a jet dryer, a rotary dryer, a fluid bed, other bed-like driers, or the like. Thus, while thermal-mechanical separator 104 may both thermally heat and mechanically agitate water/tailings mixture 114, in other examples, thermal-mechanical separator 104 may only thermally heat the mixture without providing mechanical agitation.

During operation, thermal-mechanical separator 104 can heat water/tailings mixture 114 so as to vaporize water in the mixture. Thermal-mechanical separator 104 can operate at ambient pressure, positive pressure (i.e., a pressure above ambient pressure), or vacuum pressure (i.e., a pressure below ambient pressure). That being said, in some applications, operating thermal-mechanical separator 104 at a vacuum pressure may reduce the energy input required to process a given volume of water/tailings mixture 114 through system 100 as compared to operating the separator at a different pressure. The vacuum pressure within thermal-mechanical separator 104 may reduce the boiling point of the water within the water/tailings mixture 114, thereby necessitating less energy input into system 100 and, in particular, thermal-mechanical separator 104 of system 100 to remove a given amount of water.

While thermal-mechanical separator 104 can be implemented as any piece of equipment or combinations of equipment that function to impart thermal and/or mechanical energy, in some examples, thermal-mechanical separator 104 is implemented as a piece of equipment or combinations of equipment that impart both thermal and mechanical energy. One example of such a piece of equipment is a dispersion dryer, although other types of equipment are also contemplated. A dispersion dryer, as with some other types of equipment, may be useful in that the dispersion dryer may prevent solids within water/tailings mixture 114 from agglomerating within the dispersion dryer as water is vaporized from the mixture. Such agglomeration may cause solids buildup (e.g., fouling) or other operational problems within system 100. On the other hand, in examples in which thermal-mechanical separator 104 is implemented via equipment that imparts both thermal and mechanical energy to water/tailings mixture 114, the mechanical energy imparted to the mixture may reduce or eliminate solids buildup and other problems.

Independent of the specific configuration of thermal-mechanical separator 104, in the example of FIG. 2, water/tailings mixture 114 is processed through the thermal-mechanical separator to generate a stream 116 that includes vaporized water and solids. Stream 116 is transported from thermal-mechanical separator 104 to cyclone 106. Cyclone 106 is configured to separate the gas from the solids in stream 116. Accordingly, cyclone 106 may produce a water vapor stream 118 that includes vaporized water from water/tailings mixture 114 (e.g., along with nitrogen, carbon dioxide, and other gases) and a solids stream 120 that includes dried solids from water/tailings mixture 114. Solids stream 120 may or may not also include water, although the amount of water is solids stream 120 is generally less than the amount of water in water/tailings mixture 114. Further, although the illustrated system 100 includes cyclone 106, other air/solids separators such as, e.g., a bag filter, may be used in addition to or in lieu of a cyclone.

Depending, for example, on the configuration and operating parameters of thermal-mechanical separator 104, solids stream 120 may include from approximately 65 wt % solids to approximately 99 wt % solids (e.g., approximately 95 wt % solids) and from approximately 35 wt % water to approximately 1 wt % water (e.g., approximately 5 wt % water), although other compositions of solids stream 120 are also possible. As Applicant has estimated that a solids material containing approximately 65 wt % (e.g., 75 wt %) or more solids will be "trafficable" without further processing, solids stream 120 generated by cyclone 106 may be trafficable without further processing. For example, solids stream 120 may exhibit a shear stress greater than 5,000 Pascals (e.g., greater than 10,000 Pascals) immediately upon being generated by system 100.

As noted above, system 100 in the example of FIG. 2 includes at least two centrifuges 102A and 102B (or other mechanical dewatering devices). Centrifuge 102A generates extracted water stream 112 and water/tailings mixture 114 for further processing via thermal-mechanical separator 104 and cyclone 106, as discussed above. In some embodiments, system 100 also includes at least one centrifuge 102B that generates extracted water stream 122 and water/solids mixture 124. Unlike water/tailings mixture 114 generated by centrifuge 102A, however, water/solids mixture 124 generated by centrifuge 102B may not undergo further processing via thermal-mechanical separator 104 and cyclone 106. Rather, the water/solids mixture 124 generated by centrifuge 102B may be mixed directly with solids stream 120 (e.g., as illustrated in FIG. 2) or otherwise processed.

When system 100 is arranged as shown in FIG. 2, solids within water/tailings mixture 114 generated by centrifuge 102A may be "over dried" in thermal-mechanical separator 104 while solids within water/solids mixture 124 generated by centrifuge 102B may be "under dried" or "undried" such that the solids contain more water than a final target moisture. For example, as discussed above, solids stream 120 may be dried so that the stream includes approximately 65 wt % solids to approximately 99 wt % solids (e.g., approximately 95 wt % solids) and from approximately 35 wt % water to approximately 1 wt % water (e.g., approximately 5 wt % water). By contrast, water/solids mixture 124 generated by centrifuge 102B may include from approximately 65 wt % solids to approximately 45 wt % solids (e.g., approximately 55 wt % solids) and from approximately 35 wt % water to approximately 55 wt % water (e.g., approximately 45 wt % water).

In some embodiments, the "over dried" solids stream produced via centrifuge 102A and thermal-mechanical separator 104 and the "under dried" or "undried" solids stream produced via centrifuge 102B (which may be referred to as a "wet cake") may be mixed via mixer 109 to produce a combined product stream 126. Example mixing ratios include mixing from one weight part solids stream 120 with one weight part water/solids mixture 124 to mixing approximately four weight part solids stream 120 with one weight part water/solids mixture 124. After mixing, the combined product stream 126 may be "trafficable" within the meaning of Canadian Directive 74 immediately without further processing. For example combined product stream 126 may include more than approximately 65 wt % solids and less than approximately 35 wt % water (e.g., more than approximately 75 wt % solids and less than approximately 25 wt % water, or between approximately 65 wt % solids and 80 wt % solids) and/or may exhibit a shear stress of at least 5,000 Pascals (e.g., at least 10,000 Pascals) immediately after being generated. Over drying one stream and under drying another stream (or leaving another stream undried) and then mixing the streams to produce a combined product stream 126 that has the desired solids content may allow thermal-mechanical separator 104 to operate more efficiently and/or reliably than if one single stream is directly dried to a target moisture content. Directly drying a single stream to a target moisture content (e.g., approximately 25 wt % water content) may produce a stream that is too wet for thermal-mechanical separator 104 to efficiently operate.

While solids within water/tailings mixture 114 generated by centrifuge 102A may be dried to any suitable moisture percentage via thermal-mechanical separator 104, in some examples, solids stream 120 is dried so that the stream exhibits greater than approximately 3.5 wt % water (e.g., greater than 4 wt % water) and less than approximately 96.5 wt % solids (e.g., less than approximately 96 wt % solids). When solids stream 120 is dried below approximately 3.5 wt % water, the drying mechanism may shift from a constant rate drying mechanism to diffusion limited drying mechanism, consuming a disproportionate amount of energy per unit of water removed and requiring an increased amount of drying time.

Figure 3:
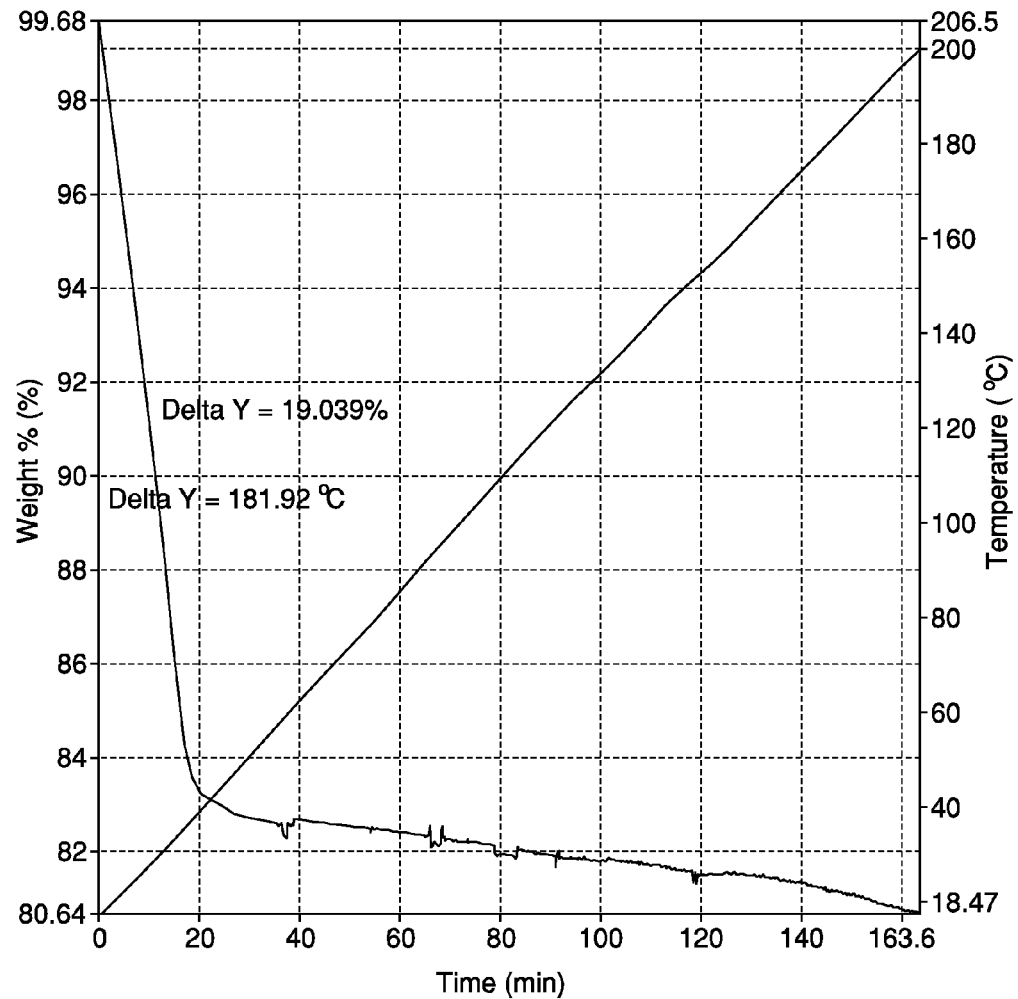
FIG. 3 is a plot of an example drying curve for a water/tailings mixture.

FIG. 3 is a plot of an example drying curve for a water/tailings mixture that initially has approximately 80 wt % solids and approximately 20 wt % water. As shown in the example curve, drying proceeds rapidly as the first approximately 17 wt % of the initial sample is evaporated (resulting in a stream that is approximately 96.4 wt % solids and 3.6 wt % water) and more slowly as additional water is evaporated. The inflection point on the drying curve may represent a shift from a constant rate drying mechanism to a diffusion limited drying mechanism. As is evident from the example curve, significantly more time and energy may be required to reduce the water of the sample stream below approximately 3.5 wt % water than to reduce the water content from approximately 20 wt % to approximately 3.5 wt % water.

With further reference to FIG. 2, system 100 includes a furnace 108. The furnace 108 is configured to heat air and/or other gas that is subsequently supplied to thermal-mechanical separator 104 for vaporizing water from water/tailings mixture 114. Furnace 108 may be powered by any suitable energy source 129 including fuel oil, propane, natural gas, or the like. In some examples, furnace 108 is configured to receive both fresh air and recycled gas from system 100 and to heat the air and recycled gas for subsequent supply to thermal-mechanical separator 104. For instance, in system 100, furnace 108 receives fresh air 130 and recycled gas 132 and heats the mixed fresh air and recycled gas to vaporize water in water/tailings mixture 114 via thermal-mechanical separator 104. Recycled gas 132 may include water vapor previously vaporized from a water/tailings mixture passed through system 100. Recycled gas 132 may also include air or other heated gas that was previously supplied to thermal-mechanical separator 104 during prior operation system 100. Recycling gas back through furnace 108 may be useful for multiple reasons. Recycled gas 132 may be at a temperature greater than ambient temperature and/or fresh air 130. Accordingly, furnace 108 may consume less energy heating the recycled gas up to a temperature suitable for operating thermal-mechanical separator 104 than when the furnace receives only fresh air 130. In addition, because the amount of oxygen in recycled gas 132 is typically less than in fresh air 130, the chance that combustibles within a gas stream downstream of furnace 108 will ignite (e.g., water vapor/gas stream 118 exiting cyclone 106) is reduced or eliminated. Further, recycling gas back through furnace 108 may reduce the overall emissions from system 100, which may be beneficial for air permitting and other environmental reasons. In addition, a water vapor concentration in the gas stream may be increased as compared to when gas is not recycled back through the furnace, which may improve the efficiency of water recovery and heat recovery in system 100.

Heated gas from furnace 108 is conveyed to thermal-mechanical separator 104 to vaporize water from water/tailings mixture 114 during operation of system 100. In some embodiments, heated gas supplied from furnace 108 is mixed with recycled solids from cyclone 106 prior to or concurrent with entering thermal-mechanical separator 104. For instance, in system 100, a portion of solids stream 120 designated as solids stream 121 is recycled from cyclone 106 and mixed with heated gas supplied from furnace 108 prior to or concurrent with entering thermal-mechanical separator 104. Control over the rate at which recycled solids stream 121 mixes with heated gas supplied from furnace 108 may allow for an optimization of properties (e.g., water content, etc.) in the stream produced by the thermal-mechanical separator 104. Further, contacting recycled solids stream 121 with hot gas from furnace 108 may consume bitumen/VOCs/naphthenic acid in the recycled solids stream, potentially reducing the amount of contaminants in the combined product stream 126 and acting as an additional heat source for vaporizing water from water/tailings mixture 114 in thermal-mechanical separator 104. Additionally or alternatively, dried solids within recycled solids stream 121 may act as a scouring agent as the solids pass through thermal-mechanical separator 104. This may reduce or eliminate solids buildup and/or process upsets within the thermal-mechanical separator 104.

When system 100 is configured to back mix recycled solids stream 121 from cyclone 106, the stream may be mixed at any suitable location at or before thermal-mechanical separator 104. In one example, thermal-mechanical separator is provided with an inlet that receives solids stream 121 separately from water/tailings mixture 114 and/or gas supplied from the furnace. In another example, solids stream 121 is combined with water/tailings mixture 114 prior to thermal-mechanical separator 104 and the combined stream enters the separator through a common inlet. In still another example, as illustrated in FIG. 2, solids stream 121 may be combined with gas from furnace 108 prior to thermal-mechanical separator 104 and the combined stream enters the separator through a common inlet.

Figure 4:
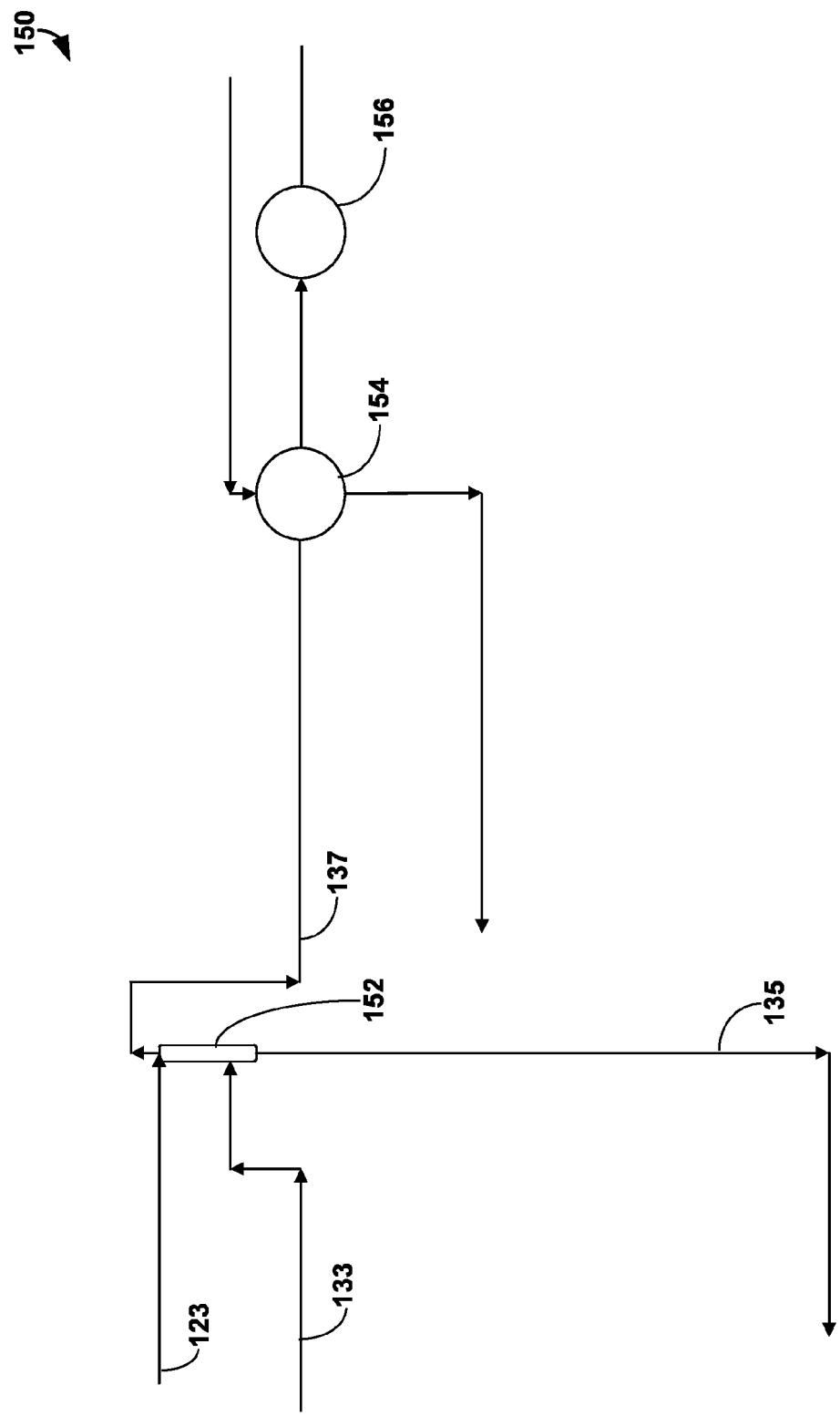
FIG. 4 is a flow diagram illustrating an example heat recovery network that may be used in conjunction with the example system of FIG. 2.

Process streams within system 100 may be passed through various process units other than those specifically illustrated in FIG. 2 including, e.g., filtration units, heat exchange units, or the like. FIG. 4 is a flow diagram illustrating an example heat recovery network that may be used in conjunction with system 100 of FIG. 2. As shown in the illustrated example, the heat recovery network 150 includes a scrubber 152, a first heat exchanger 154, and a second heat exchanger 156. In operation, all or a portion of extracted water stream 112 from centrifuge 102A and/or extracted water stream 122 from centrifuge 102B may be passed through scrubber 152 so as to remove fines and other particulate matter. In addition to or in lieu of passing extracted water stream 112 and/or extracted water stream 122 through scrubber 152, all or a portion of the water vapor stream 118 from cyclone 106 may be passed through scrubber 152 so as to remove fines and other particulate matter. Scrubber 152 and the heat recovery network may prepare the streams for further downstream processing or disposal such as, e.g., processing at a water treatment plant, return to a settling pond, or the like. In some embodiments, extracted water generated by centrifuge 102A and 102B and/or cyclone 106 in system 100 may be sent to an oil sands extraction or processing facility, where the water can be used to extract and recover bitumen from oil sands. For example, the water may be sent to a Clark hot water extraction process where the water is used to extract bitumen from commingled tailings.

Independent of the downstream use of the water recovered in system 100, in the example of heat recovery network 150 illustrated in FIG. 4, scrubber 152 is configured to receive all or a portion the extracted water stream 122 from centrifuge 102B (designated as stream 123 on FIGS. 2 and 4) and all or a portion of the water vapor stream 118 from cyclone 106 (designated as stream 133 on FIGS. 2 and 4). Stream 123 and 133 may be mixed or otherwise commingled before, at, or within scrubber 152 so that liquid water from centrifuge 102B is physically and/or thermally contacted with water vapor from cyclone 106. After passing through scrubber 152, the scrubbed streams may be processed using any suitable downstream units. While scrubber 152 may remove fines and other particulate material from stream 133, in other examples, heat recovery network 150 may not include a scrubber.

In the example of FIG. 4, water which has passed through scrubber 152 (designated as stream 135) may be sent to an oil sands extraction or processing facility, where the water can be used to extract and recover bitumen from oil sands. In some embodiments, the water may be sent to a Clark hot water extraction process where the water can be used to extract bitumen from commingled tailings. Water in stream 135 may be heated to an elevated temperature (e.g., from 160 degrees F. to 220 degrees F.) upon thermal contact with water vapor from cyclone 106, making subsequent use of the stream in a hot water extraction processes thermally efficient.

Heat recovery network 150 in the example of FIG. 4 also includes a vapor stream 137 which exits scrubber 152. Vapor stream 137 may include water vapor from cyclone 106 which has passed through scrubber 152 (although in other examples the water may not pass through a heat exchanger). Vapor stream 137 can be processed using any suitable downstream units which, in the example of FIG. 4, are shown as two heat exchanger units 154 and 156. Heat exchanger 154 may be an air preheater configured to preheat fresh air 130 (FIG. 2) before the fresh air enters furnace 108. Heat exchanger 156 may be a secondary heat exchanger than can be used to recovery heat for any number of processes including, e.g., oil sands extraction processes, bitumen hot water extraction process, or the like.

While FIG. 4 illustrates two heat exchangers 154 and 156 in series, more (e.g., three, four) or fewer (e.g., one, none) heat exchangers may be used, and it should be appreciated that the disclosure is not limited in this respect. Further, although water vapor from cyclone 106 (which may or may not have passed through scrubber 152) can be passed through a heat exchanger to recover thermal energy, in other examples, the stream can be directly added (e.g., mixed) with recycle water from the primary separation vessel or pond 11, wet sand, or another stream to condense the water directly and to cause thermal exchange.

Figure 5:
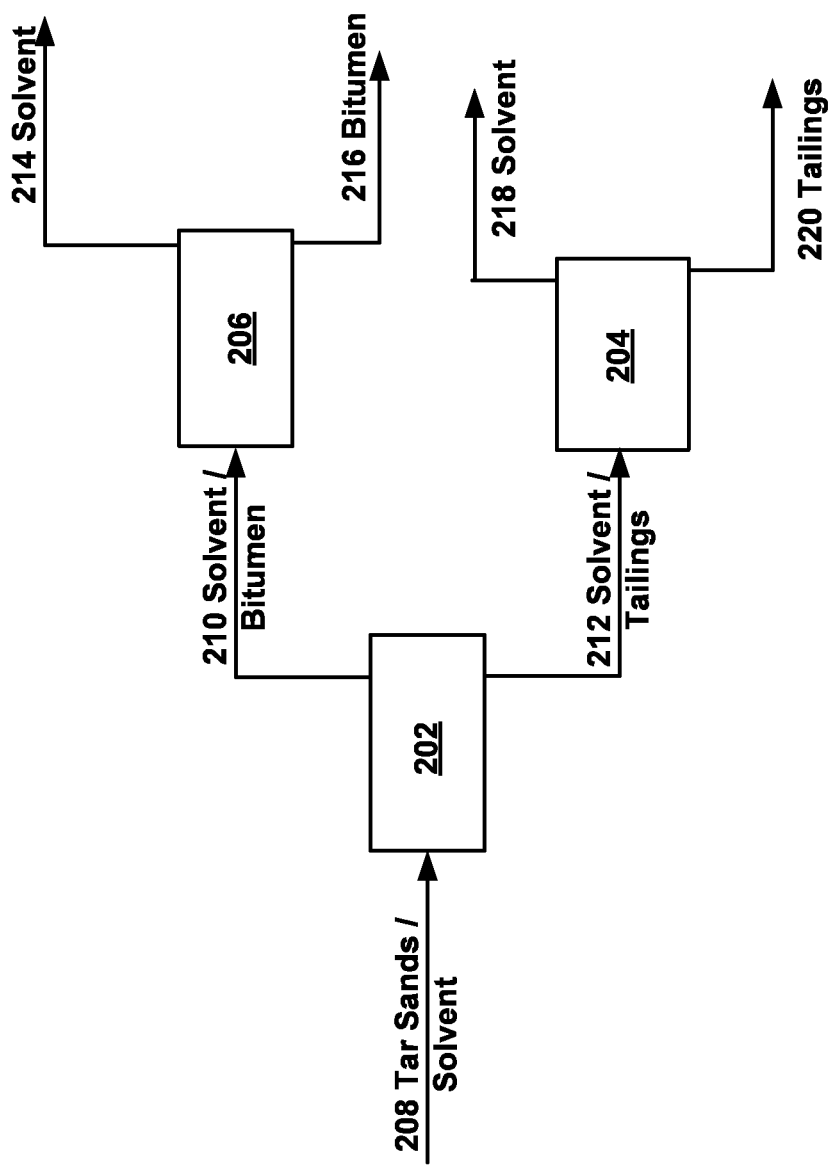
FIG. 5 is a flow diagram of an example process for extracting bitumen from oil sands with a solvent and recovering the solvent from bitumen and tailings.

As discussed above, bitumen can be separated from non-bitumen components (e.g., sand and clay) using a variety of different liquids including, for example, water and organic solvents. FIG. 5 is a flow chart illustrating an example embodiment for the treatment of tailings from oil sands that have undergone bitumen recovery using an organic solvent. Such tailings may be generated by contacting bitumen-rich oil sands with the organic solvent. For example, hot organic solvent can be injected into a well in the ground so as to dilute bitumen/oil sands in the ground and allow the material to flow, e.g., out of a parallel extraction well. As another example, organic solvent can be mixed with mined oil sands (which may include bitumen and tailings), e.g., in combination with mechanical agitation, to extract the bitumen from the non-bitumen components. Example organic solvents include hexane, pentane, and naphthalene, although other organic solvents are also possible.

Independent of the specific technique used to contact the organic solvent with the oil sands components (e.g., bitumen, sand, clay, or the like), it may be desirable to separate the organic solvent from the non-bitumen tailing components after extracting the bitumen. The solvent can then be recycled, repurposed, or otherwise disposed of. Likewise, the tailings can be recycled or disposed of after separating the tailings from the solvent.

In the example of FIG. 5, system 200 includes a separation vessel 202 for mechanically separating bitumen dissolved in solvent from non-bitumen tailings and a pressure vessel 204 for evaporating solvent from the tailings under non-atmospheric pressure. In addition, system 200 includes a solvent recovery unit 206 for separating extracted bitumen from the organic solvent.

In operation, a stream 208 that includes oil sands (e.g., bitumen and tailings) mixed with an organic solvent is transferred (e.g., pumped) into separation vessel 202. Separation vessel 202 may be a settling tank, a centrifuge, a filter, or another vessel for separating bitumen dissolved in solvent from non-bitumen oil sands tailings. Under the influence of gravity and/or an external force imparted to the mixture of oil sands and organic solvent, separation vessel 202 may separate the mixed oil sands and solvent so as to generate a stream 210 that includes (e.g., consists essentially of) bitumen dissolved in solvent and a stream 212 that includes (e.g., consists essentially of) oil sands tailings with solvent (e.g., oil sands tailings wetted with solvent). The stream 210 that includes bitumen dissolved in solvent can be processed in solvent recovery unit 206 to generate a solvent stream 214 and a bitumen stream 216. The solvent stream 214 may be a stream that include organic solvent substantially free of bitumen and/or tailings and that can be recycled or otherwise disposed. The bitumen stream 216 can be a stream that includes bitumen substantially free of solvent (or that includes a desired amount of solvent) and/or that is substantially free of tailings and that can be sent to a refinery for further processing.

In system 200, pressure vessel 204 receives stream 212, which can include oil sands tailings mixed and/or wetted with solvent. Pressure vessel 204 may be configured to operate at a non-atmospheric pressure so as to evaporate solvent from the tailings, thereby generating a solvent stream 218 and a tailings stream 220. For example, pressure vessel 204 may be configured to operate at a vacuum pressure relative to the pressure of the incoming stream 212. The vacuum pressure may be sufficiently low such that the sensible or residual heat of the incoming stream is sufficient to vaporize the solvent in the stream upon entering the pressure vessel.

In some examples, stream 212 is processed in an apparatus configured to mechanically separate solvent from tailings in the stream before being received by pressure vessel 204. For example, stream 212 may be processed in a filter press, centrifuge, or any other device described as being suitable for use as first apparatus 20 (FIG. 1), so as to mechanically separate a portion of the solvent from tailings before being received by pressure vessel 204.

In addition, in some examples, steam 212 is heated prior to and/or within pressure vessel 204 so as to help vaporize solvent from the tailings. Stream 212 can be heated to any suitable temperature, and the temperature may vary based, e.g., on the operating pressure of pressure vessel 204 and the chemical composition of the solvent mixed with the tailings. In one example, stream 212 is indirectly heated prior to entering pressure vessel 204 using a transfer line heater, a heat exchanger, or other indirect heating apparatus. In another example, stream 212 is directly heated prior to or within pressure vessel 204 by injecting steam into the stream.

While stream 212 may be heated prior to and/or within pressure vessel 204, in other examples, stream 212 is not heated between a separation vessel configured to separate mixed oil sands and solvent (e.g., separation vessel 202) and the pressure vessel. Instead, a vacuum pressure within pressure vessel 204 may be set sufficiently low such that the sensible or residual heat of the incoming stream is sufficient to vaporize the solvent in the stream upon entering the pressure vessel. Such a configuration may allow stream 212 to be processed without preheating the stream prior to pressure vessel 204. This may be useful when the stream includes abrasive and/or sticky solids.

Pressure vessel 204 can be implemented as any device or combination of devices that are configured to operate at a reduced pressure relative to the incoming stream 212 so as evaporate solvent from the stream. Example process units that can be implemented as pressure vessel 204 include an evaporator, a flash drum, a purge drum, and a purge bin. In different examples, pressure vessel 204 may be indirectly heated (e.g., jacketed) and/or directly heated (e.g., by injecting steam into the vessel), or unheated. When pressure vessel 204 is unheated, the vacuum pressure in the vessel may be set sufficiently low such that the latent heat of the incoming stream is sufficient to vaporize the solvent upon entering the pressure vessel.

Pressure vessel 204 can be operated at any suitable pressure when processing solvent and tailings in stream 212. In some examples, pressure vessel 204 is operated at a vacuum pressure relative to a pressure of an upstream processing unit. For example, pressure vessel 204 may be operated at a vacuum pressure ranging from approximately 10 psig to approximately 30 psig below the pressure of an upstream processing unit, although other pressures are also possible. The vacuum pressure within the pressure vessel may reduce the boiling point of the solvent within stream 212, thereby necessitating less energy input to vaporize a given amount of solvent.

Figure 6:
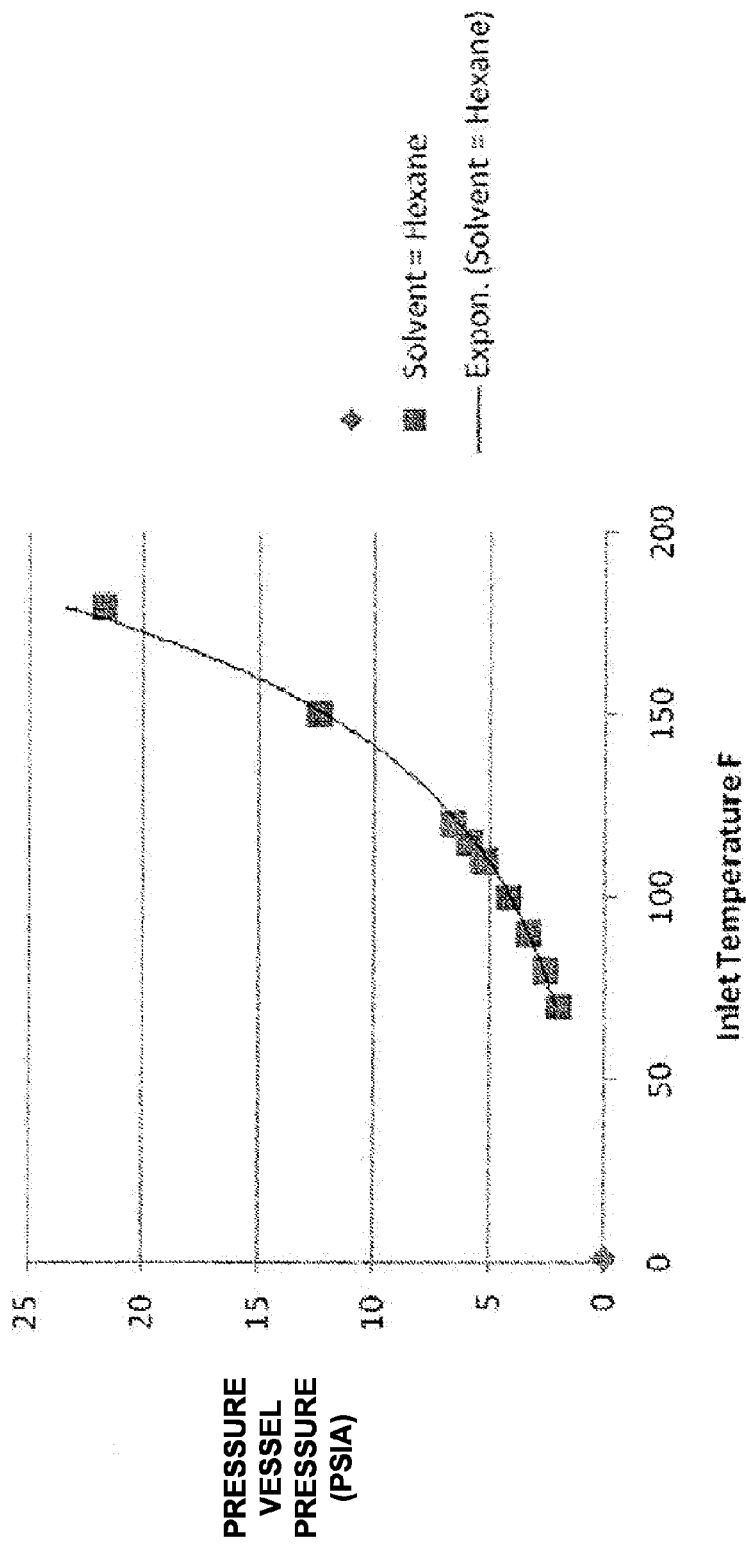
FIG. 6 is a plot of an example relationship between the temperature of a material fed to a pressure vessel and pressure in the vessel required to vaporize solvent from the material.
Figure 7:
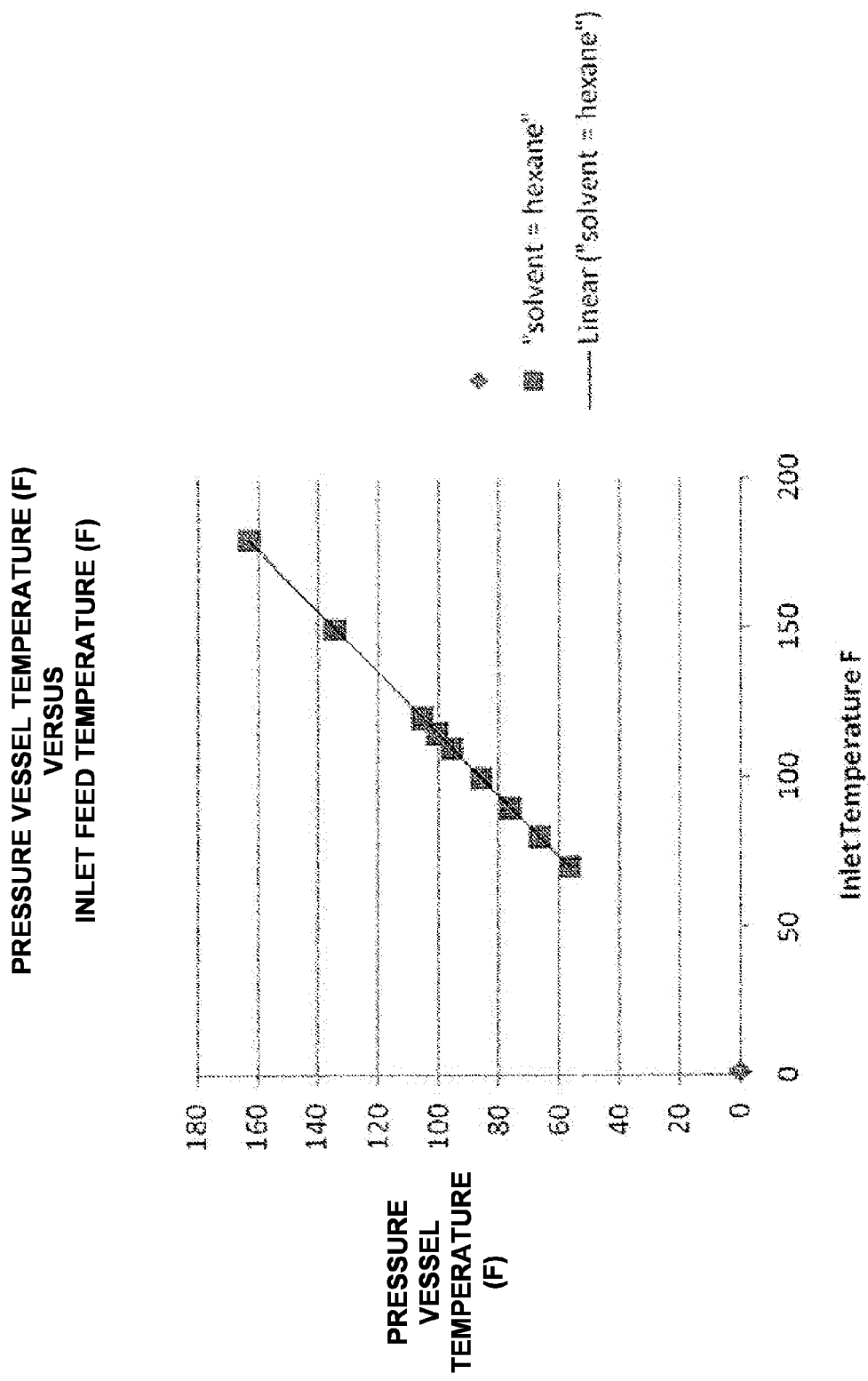
FIG. 7 is a plot of an example relationship between the temperature of a material fed to a pressure vessel and temperature in the vessel required to vaporize solvent from the material.

FIG. 6 shows an example relationship between the temperature of the material fed (e.g., stream 212) to the pressure vessel 204 and the pressure in the vessel. FIG. 7 shows a similar relationship between the temperature of the feed and the temperature in the vessel. FIGS. 6 and 7 are based on the following assumptions: specific heats (in BTU//b-F) of the solids (0.3), solvent (0.6) and water (1.0); the latent heat of vaporization (in BTU/lb) of solvent (100) and water (1000), and there being no external heat input. These heat balance relationships are based on removing solvent (e.g., hexane) from 4% down to 0.04% by weight. For example, if the inlet feed temperature is 120° F., the pressure vessel temperature may be 105° F., and the pressure in the pressure vessel may be 6.6 psia (pounds per square inch absolute).

In a particularly preferred embodiment, solvent is removed under vacuum in a continuous, rather than batch, process mode. For instance, such an embodiment may employ a method for continuous treatment of the tailings under vacuum, the method comprising continuously feeding tailings at a first pressure into a pressure vessel operating at a second pressure lower than the first pressure, continuously processing the material in the pressure vessel at the second pressure, and continuously discharging the processed solid material from the pressure vessel to a downstream environment at a third pressure different (e.g., higher) than the second pressure. In turn, the tailings can be continuously delivered to a pressure vessel at substantially the same pressure (i.e., under vacuum) as the pressure vessel, without exposing the material to significant shear stresses or disrupting the operating pressure of the pressure vessel. Screw feeders, air locks, or other devices can be used to continuously deliver the tailings to the pressure vessel at substantially the same pressure as within the pressure vessel. As another examples, tailings at a first pressure higher than an operating pressure within the pressure vessel can be continuously delivered through a control valve that is configured to control (e.g., minimize) the amount of gas carried into the vessel with the solids.

Various examples of the invention have been described. These and other examples are within the scope of the following claims.

The invention claimed is:
1. A process comprising:
delivering oil sands tailings mixed with water to a primary separation vessel so as to separate the oil sands tailings into a plurality of layers, wherein at least one of the plurality of layers comprises a mature fines tailing material that includes oil sands tailings suspended in water;
extracting the mature fines tailing material from the primary separation vessel and delivering the mature fines tailing material to an apparatus configured to mechanically separate a portion of the water in the mature fines tailing material from a portion of the oil sands tailings suspended in the water so as to generate a concentrated oil sands tailings material;

delivering the concentrated oil sands tailings material along with heated gas to an apparatus configured to thermally evaporate water from the concentrated oil sands tailings materials, thereby producing a trafficable dried oil sands tailings material and a gas stream comprising water, nitrogen, and carbon dioxide;

separating the gas stream from the trafficable dried oil sands tailings material; and recycling at least a portion of the gas stream separated from the trafficable dried oil sands tailings material by delivering the portion of the gas stream to a furnace configured to generate the heated gas that is supplied to the apparatus configured to thermally evaporate water.

2. The process of claim 1, wherein the trafficable dried oil sands tailing material includes less than approximately 35 wt % water.

3. The process of claim 1, wherein the trafficable dried oil sands tailing material exhibits a shear stress greater than 10,000 Pascals.

4. The process of claim 1, wherein the apparatus configured to mechanically separate the portion of the water includes at least one of a centrifuge, a filter press, a leaf filter, and a hydrocyclone.

5. The process of claim 1, wherein the apparatus configured to thermally evaporate water comprises at least one of a fluid bed dryer, a purge vessel, a flash dryer, a dispersion dryer, a ring dryer, a jet dryer, and a rotary dryer.

6. The process of claim 1, wherein the apparatus configured to mechanically separate the portion of the water comprises a centrifuge, and the apparatus configured to thermally evaporate water comprises a dispersion dryer.

7. The process of claim 1, wherein the mature fines tailing material comprises from approximately 10 wt % solids to approximately 40 wt % solids and from approximately 90 wt % water to approximately 60 wt % water.

8. The process of claim 7, wherein the concentrated oil sands tailings material comprises from approximately 65 wt % solids to approximately 45 wt % solids and from approximately 35 wt % water to approximately 55 wt % water.

9. The process of claim 1, further comprising mixing a flocculant with the mature fines tailing material prior to delivering the mature fines tailing material to the apparatus configured to mechanically separate the portion of the water.

10. The process of claim 1, wherein separating the gas stream from the trafficable dried oil sands tailing material comprises delivering a stream containing the gas stream and trafficable dried oil sands tailing material from the apparatus configured to thermally evaporate water to a cyclone.

11. The process of claim 10, further comprising recycling a portion of the trafficable dried solids material by at least mixing the portion of the trafficable dried solids material with the concentrated oil sands tailings material prior to or concurrent with entering the apparatus configured to thermally evaporate water.

12. The process of claim 10, further comprising at least one of directly or indirectly transferring heat from the gas stream generated by the cyclone to a water stream used in an upstream bitumen extraction process.

13. The process of claim 1, wherein the primary separation vessel comprises a settling pond.

14. The process of claim 13, wherein the plurality of layers comprise an uppermost layer substantially free of tailings, a bottom layer of settled-out tailings, and a middle layer comprising the mature fines tailing material.

15. The process of claim 1, further comprising:
mixing mined oil sands with water to create a bitumen-rich phase and a water/tailings-rich phase;
separating the bitumen-rich phase from the water/tailings-rich phase; and
delivering the water/tailings-rich phase as the oil sands tailings mixed with water to the primary separation vessel.

16. The process of claim 1, wherein the primary separation vessel comprises a settling pond and the plurality of layers comprise a water layer, a mature fines tailing layer comprising the mature fines tailing material, and a bottom layer of settled solids.

* * * * *